Figure 1:
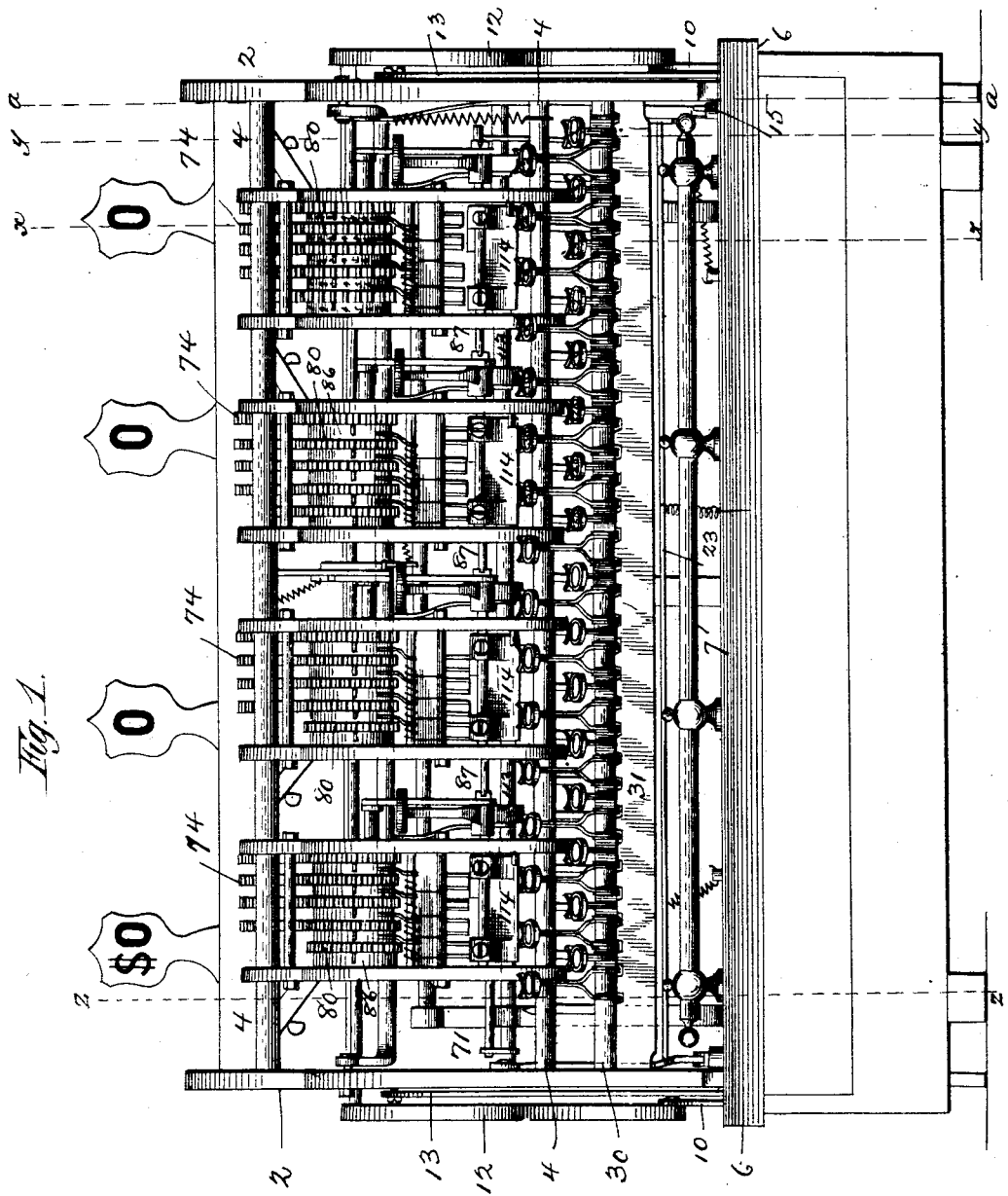

(No Model.) 13 Sheets—Sheet 1.

O. TVERDAL.
CASH REGISTER AND INDICATOR.

No. 514,293. Patented Feb. 6, 1894.

WITNESSES:
F. L. Ourand
W. L. Coombs

INVENTOR:
Ole Tverdal
by Louis Bagger & Co.
Attorneys (No Model.)

13 Sheets—Sheet 3.

O. TVERDAL.
CASH REGISTER AND INDICATOR.

No. 514,293.

Patented Feb. 6, 1894.

WITNESSES:
F. L. Durand
J. L. Coombs

INVENTOR:
Ole Tverdal,
by Lucas Bagger & Co.
Attorneys.

(No Model.) 13 Sheets—Sheet 4.

O. TVERDAL.
CASH REGISTER AND INDICATOR.

No. 514,293. Patented Feb. 6, 1894.

WITNESSES: INVENTOR:
Ole Tverdal,
Attorneys.

(No Model.)  13 Sheets—Sheet 5.

O. TVERDAL.
CASH REGISTER AND INDICATOR.

No. 514,293.  Patented Feb. 6, 1894.

WITNESSES:
F. L. Durand
W. L. Coombs

INVENTOR:
Ole Tverdal
by James Sagger & Co.
Attorneys.

(No Model.) 13 Sheets—Sheet 6.

O. TVERDAL.
CASH REGISTER AND INDICATOR.

No. 514,293. Patented Feb. 6, 1894.

Fig. 6.

WITNESSES:
F. L. Durand
Jo. L. Coombs

INVENTOR:
Ole Tverdal
by Laws Bagger & Co.
Attorneys.

(No Model.)
13 Sheets—Sheet 7.
O. TVERDAL.
CASH REGISTER AND INDICATOR.
No. 514,293. Patented Feb. 6, 1894.
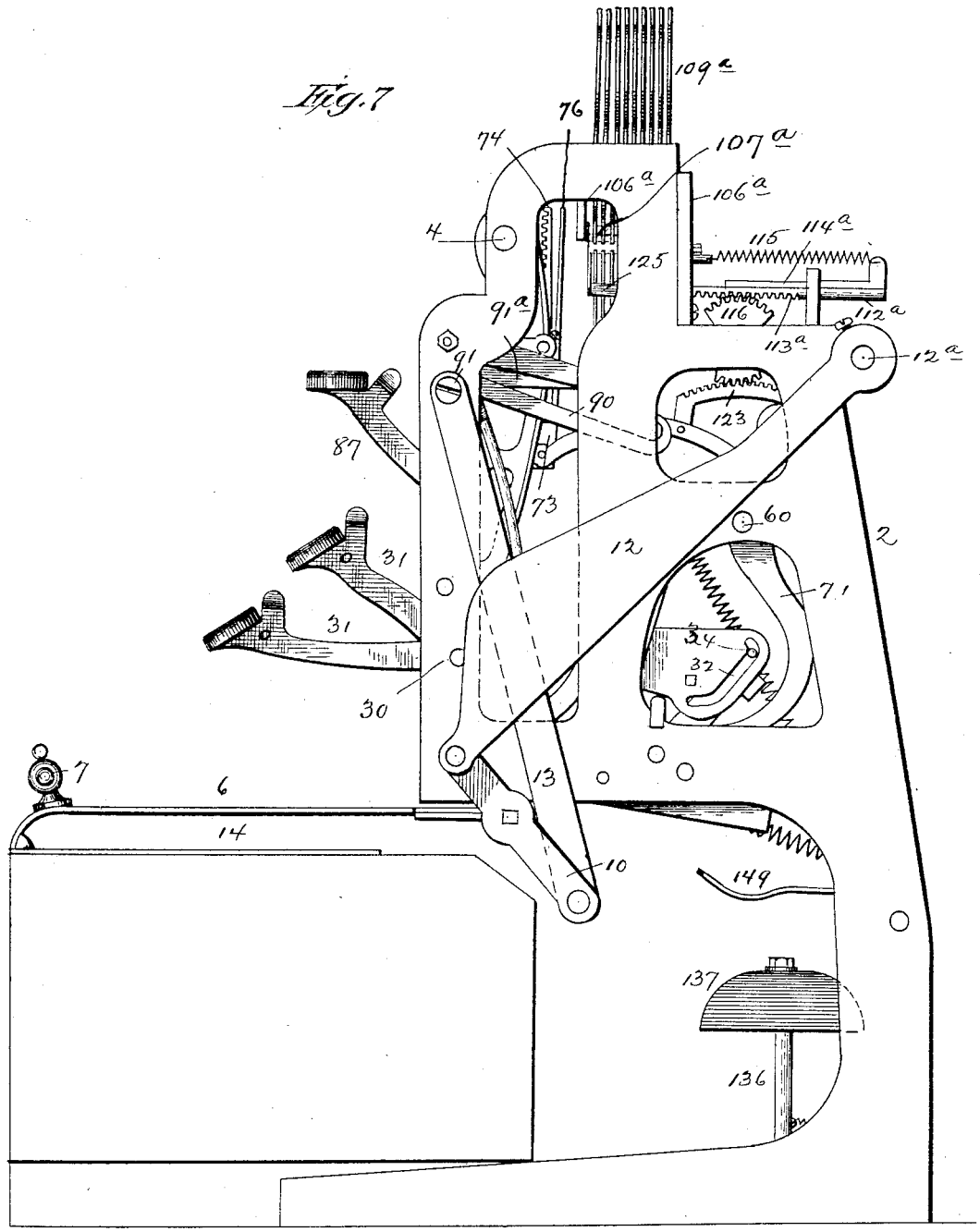
WITNESSES:
INVENTOR:
Ole Tverdal,
Attorneys (No Model.)
13 Sheets—Sheet 8.
O. TVERDAL.
CASH REGISTER AND INDICATOR.
No. 514,293. Patented Feb. 6, 1894.
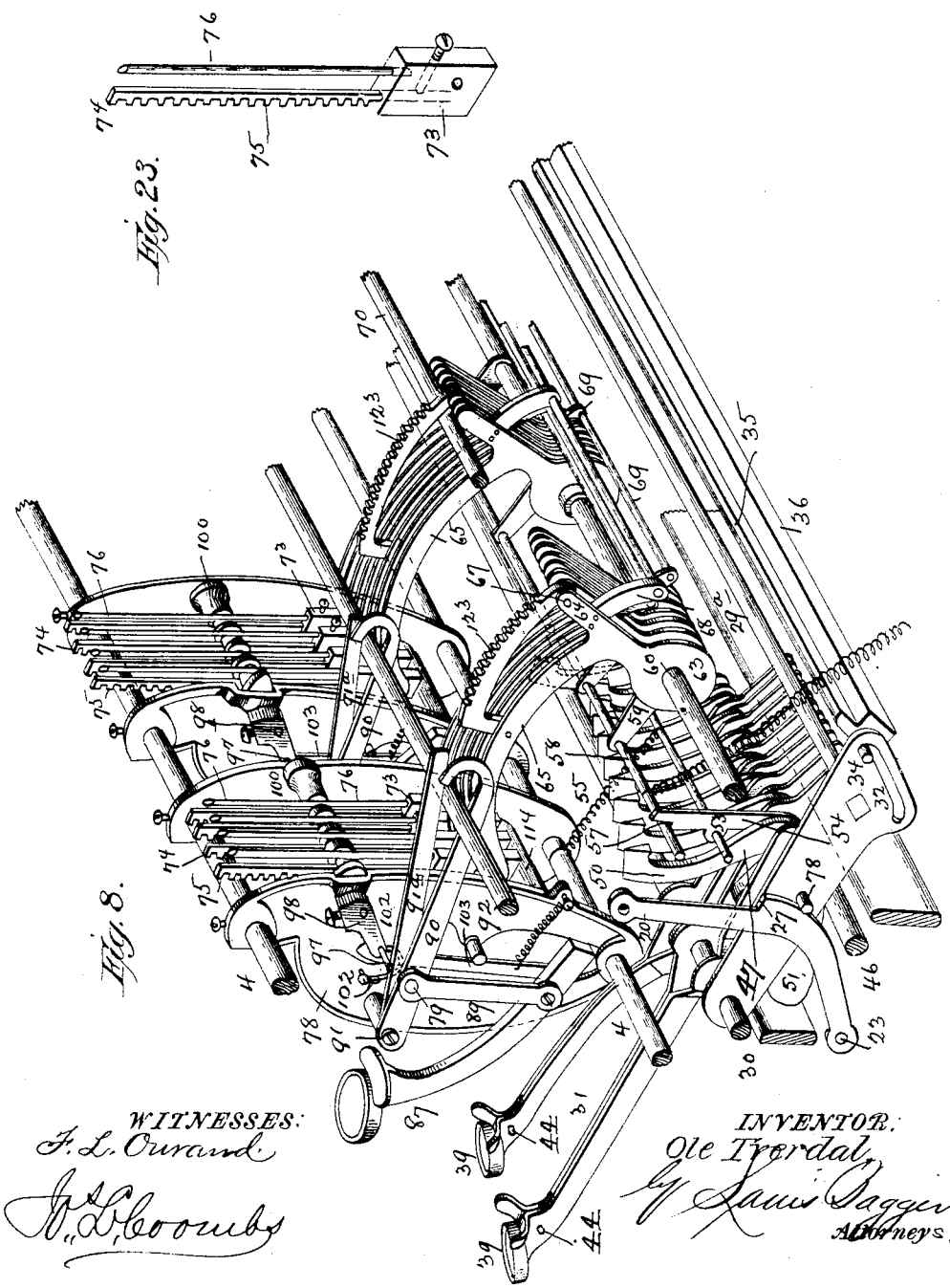

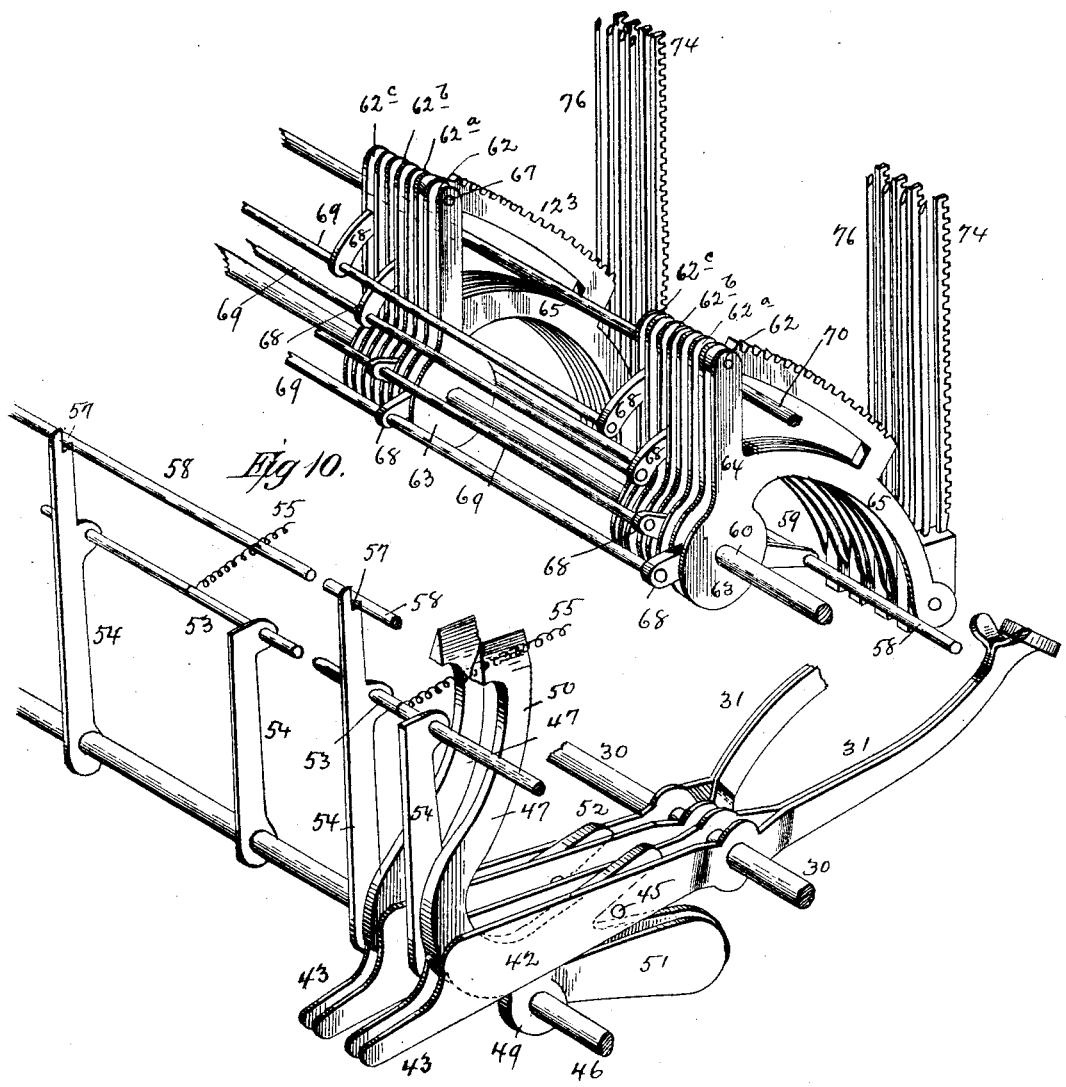

(No Model.) 13 Sheets—Sheet 10.

O. TVERDAL.
CASH REGISTER AND INDICATOR.

No. 514,293. Patented Feb. 6, 1894.

WITNESSES:
F. L. Durand
W. L. Coombs

INVENTOR:
Ole Tverdal,
By Lewis Dagger & Co.
Attorneys.

(No Model.)  
13 Sheets—Sheet 11.
O. TVERDAL.
CASH REGISTER AND INDICATOR.
No. 514,293. Patented Feb. 6, 1894.
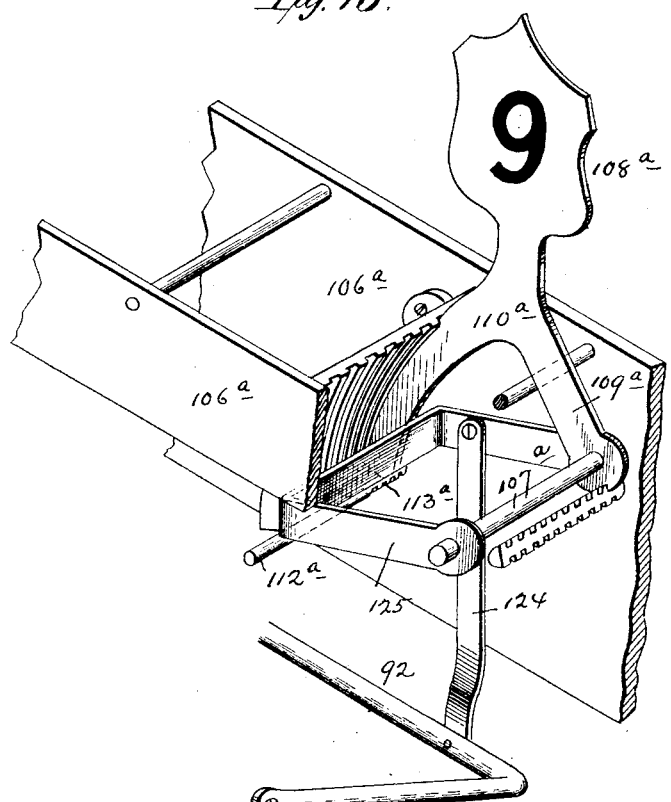
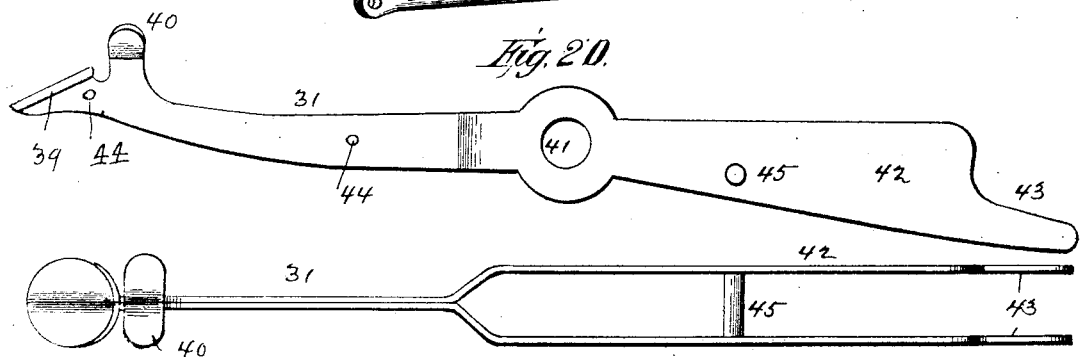

(No Model.) 13 Sheets—Sheet 12.

O. TVERDAL.
CASH REGISTER AND INDICATOR.

No. 514,293. Patented Feb. 6, 1894.

WITNESSES:
F. L. Ourand
Jo. L. Coombs

INVENTOR:
Ole Tverdal
by Louis Bagger & Co.
Attorneys.

(No Model.) 13 Sheets—Sheet 13.
O. TVERDAL.
CASH REGISTER AND INDICATOR.
No. 514,293. Patented Feb. 6, 1894.
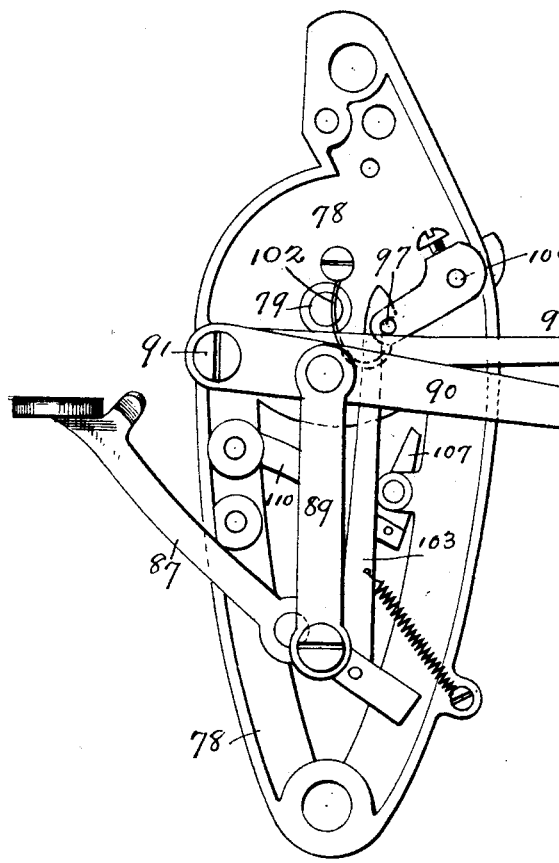
Fig. 15.
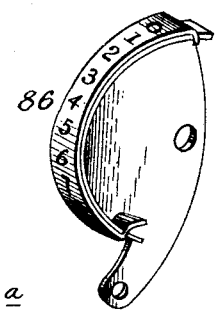
Fig. 16.
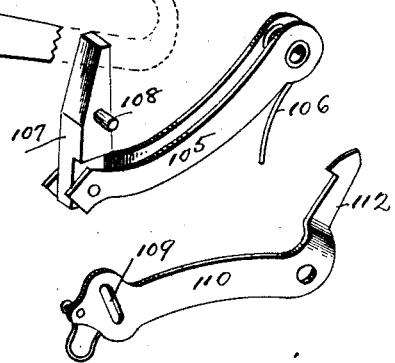
Fig. 17.
Fig. 18.
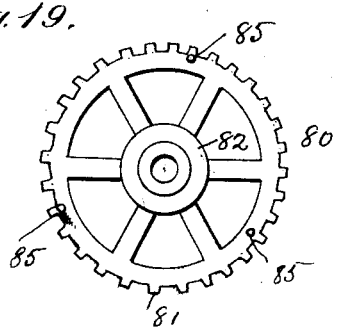
Fig. 19.
WITNESSES:
F. L. Ourand
Jos. L. Coombs
INVENTOR.
Ole Tverdal
By Louis Bagger & Co.
Attorneys

UNITED STATES PATENT OFFICE.

OLE TVERDAL, OF STOUGHTON, WISCONSIN, ASSIGNOR TO THE UNITED STATES CASH REGISTER COMPANY, OF SAME PLACE.

CASH REGISTER AND INDICATOR.

SPECIFICATION forming part of Letters Patent No. 514,293, dated February 6, 1894.

Application filed July 17, 1893. Serial No. 480,720. (No model.)

*To all whom it may concern:*

Be it known that I, OLE TVERDAL, a citizen of the United States, and a resident of Stoughton, in the county of Dane and State of Wisconsin, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in the cash registers for which Letters Patent No. 486,306, dated November 15, 1892, were granted to me, assignor to the United States Cash Register Company. In said patented invention the individual sales are displayed and the aggregate sales registered by depressing indicating and registering keys. By increasing the number of registering devices the amount of change taken from the till or cash receptacle in the course of business and credit sales may be registered by depressing the indicating keys which are depressed in registering cash sales. The "indicating" keys are employed for the purpose of throwing into operative condition the display plates, and also for setting the mechanism by which the amounts corresponding with the key depressed are registered, by the movement of the till cover. The "registering" keys are for the purpose, when depressed, of throwing the devices set by the indicating keys, into engagement with the registering mechanism, whereby the amounts corresponding with the indicating key depressed, are registered. These keys also perform other functions, such for instance, as unlocking the cash drawer, all of which will be hereinafter described.

The object of the present invention is to simplify and improve the construction of the register whereby it will be more efficient in operation.

Figure 2:
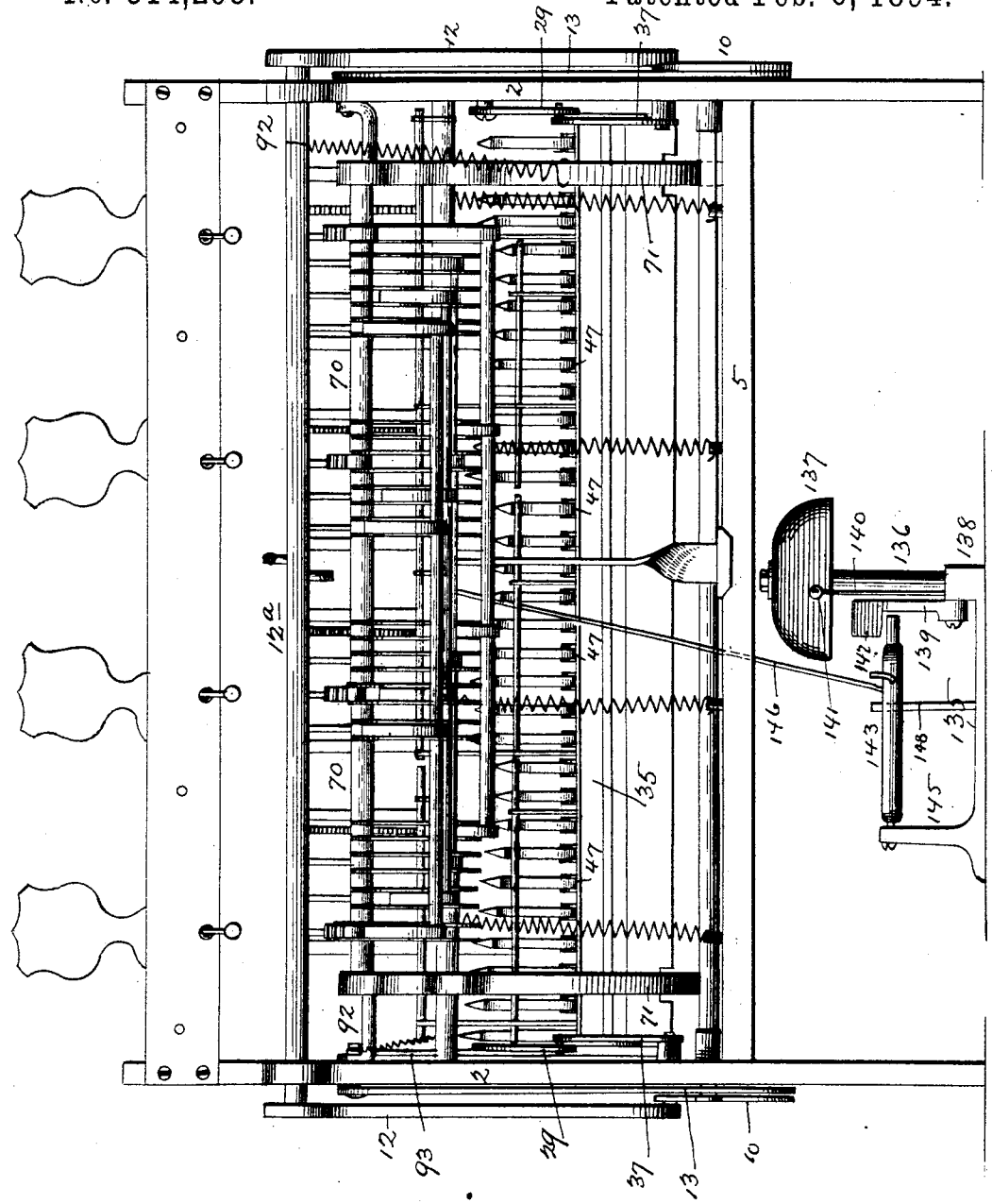
Figure 3:
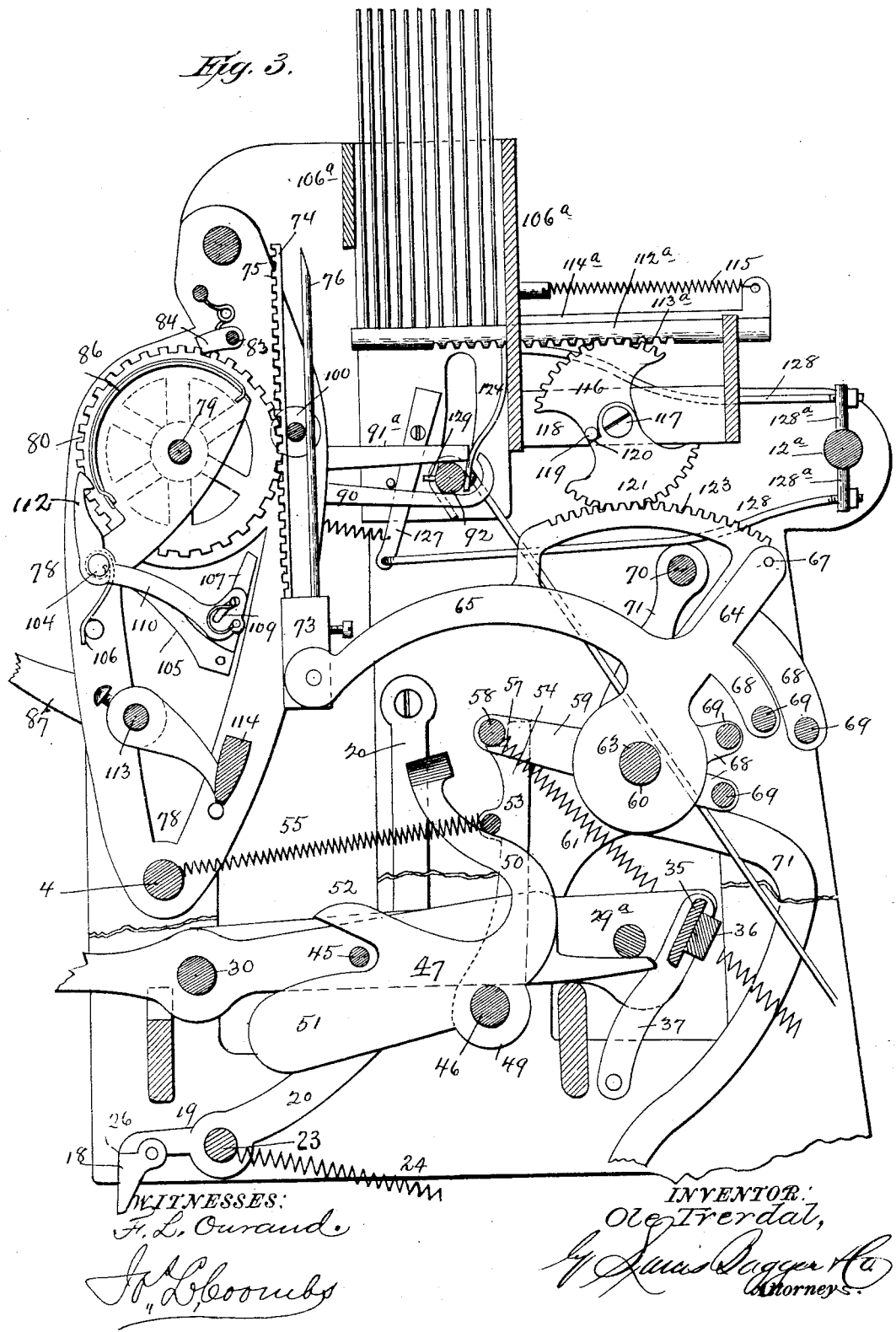
Figure 4:
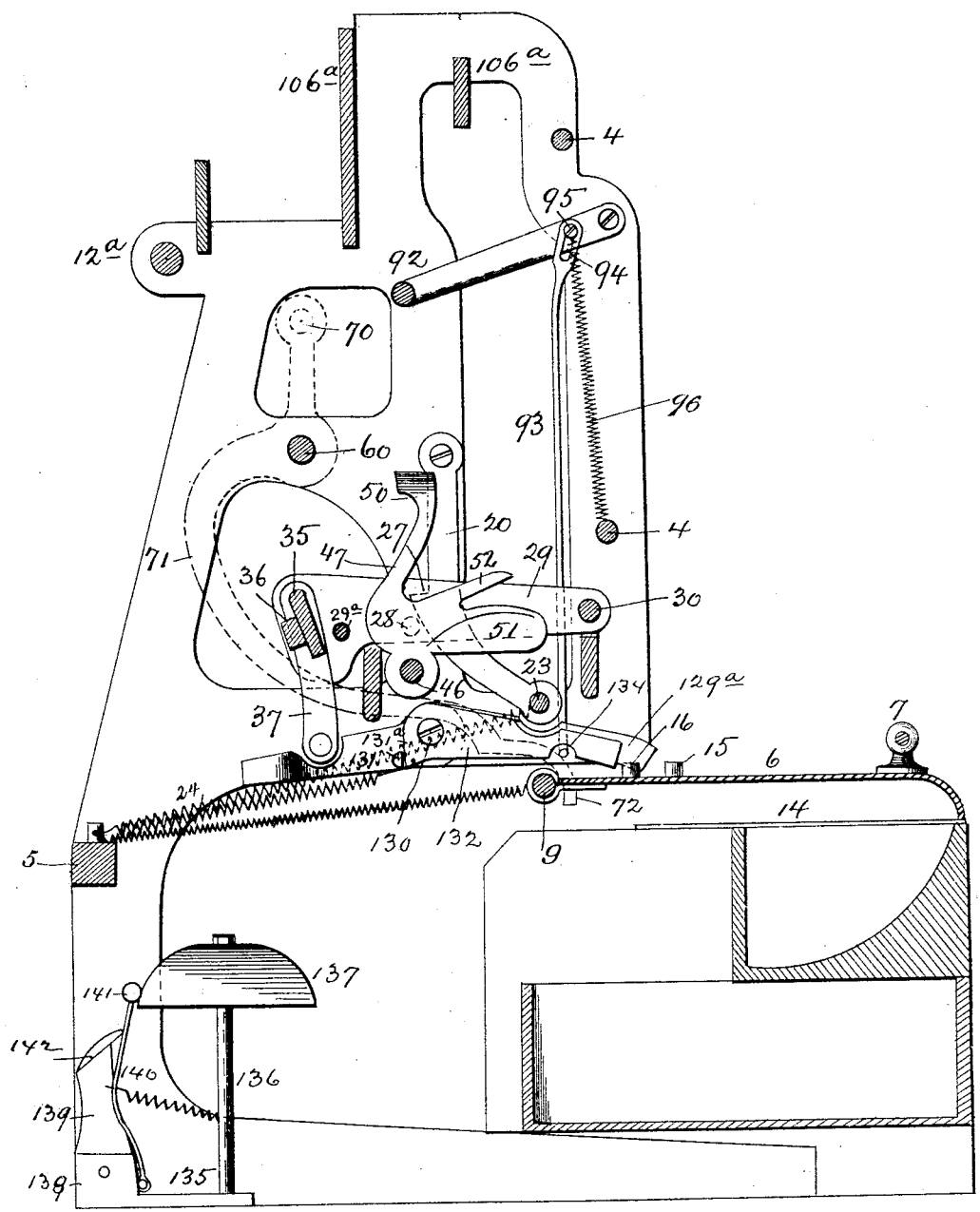
Figure 5:
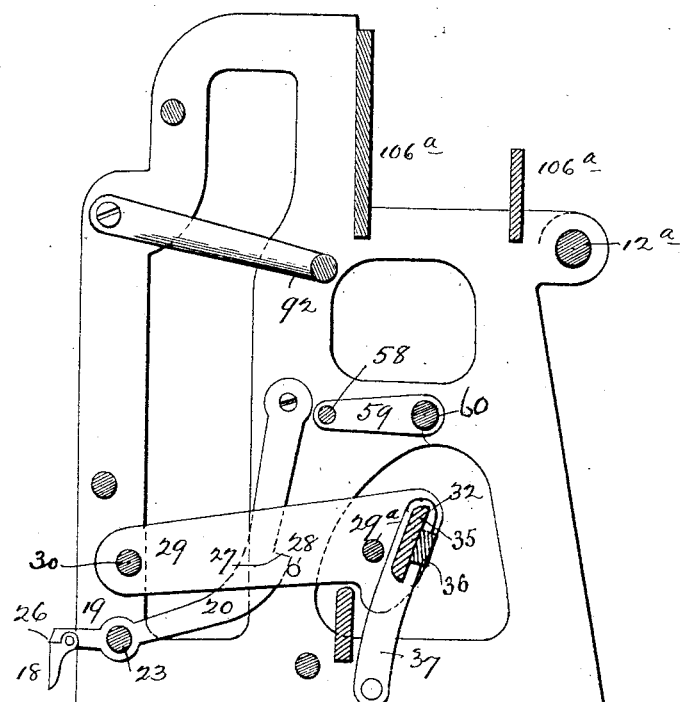
Figure 24:
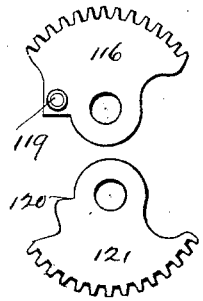
Figure 11:
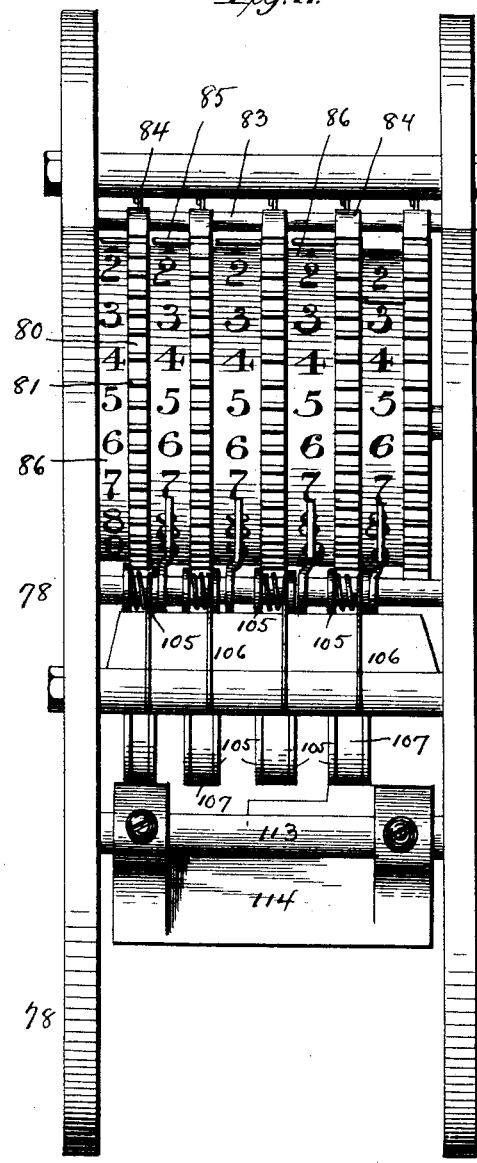
Figure 12:
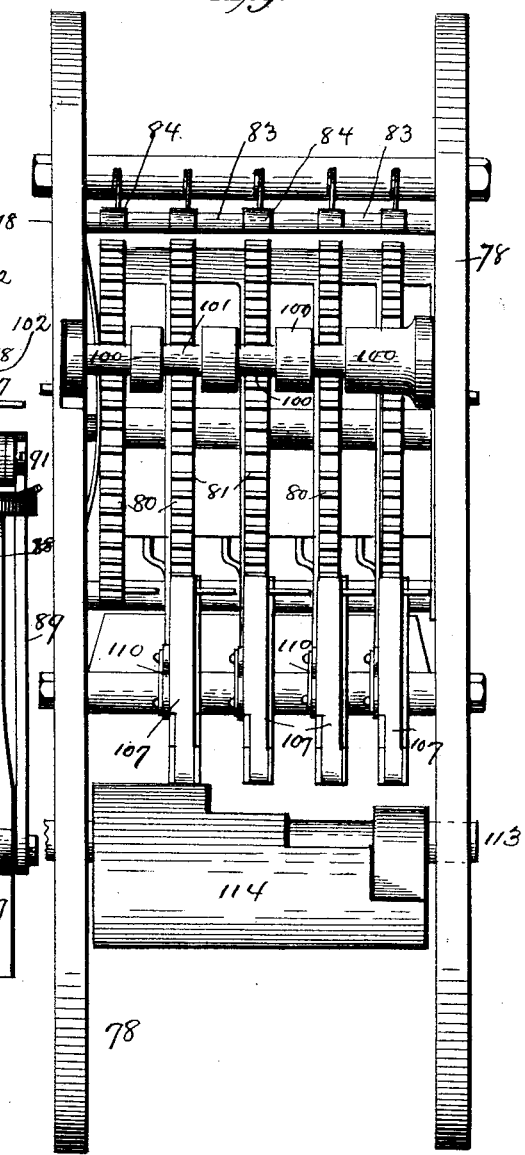
Figure 14:
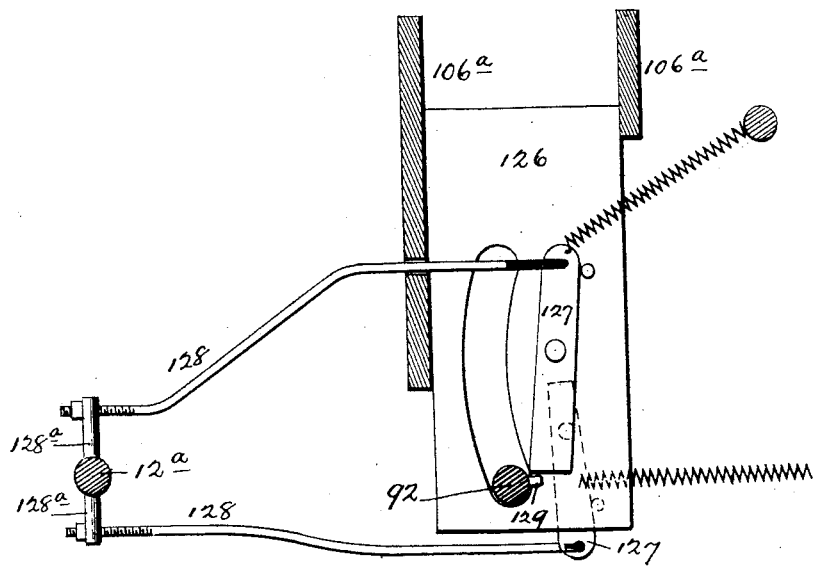
Figure 22:
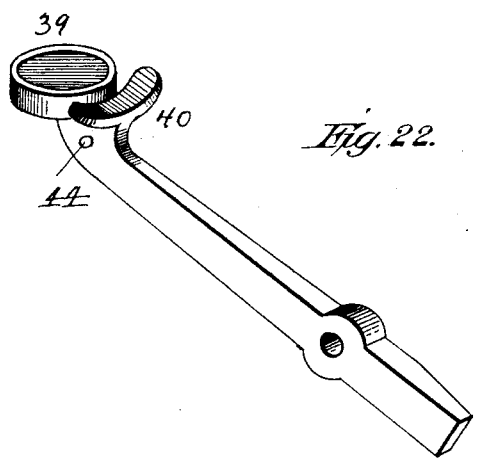

In the accompanying drawings: Figure 1 is a front view of a cash register constructed in accordance with my invention, without the casing. Fig. 2 is a rear view. Fig. 3 is a section on the line $x$—$x$, Fig. 1. Fig. 4 is a section on the line $y$—$y$, Fig. 1. Fig. 5 is a section on the line $z$—$z$, Fig. 1. Fig. 6 is a section on the line $a$—$a$, Fig. 1. Fig. 7 is a side elevation the casing being removed. Figs. 8 and 9 are detail perspective views of the means for operating the registering pitmen. Fig. 10 is a detail perspective view of the dogs operated by the indicating keys. Figs. 11 and 12 are front and rear views respectively of the registering mechanisms. Fig. 13 is a detail perspective view of one of the display plates and its connections. Fig. 14 is a detail sectional view showing the spring dogs for locking the registering keys. Fig. 15 is a side elevation of one of the registering casings. Figs. 16, 17, 18 and 19 are detail views of parts of the registering mechanism. Figs. 20 and 21 are detail perspective views of the indicating keys. Fig. 22 is a detail perspective view of one of the indicating keys. Fig. 23 is a detail view of one of the registering pitmen. Fig. 24 is a detail view of the segment for operating the display plates.

In the said drawings I have illustrated four registering mechanisms, which are separate and distinct from each other, and one of which may be used to register cash sales, one to register credit sales, one to register amounts taken from the till and the other for any other purpose found convenient. It will be obvious, however, that a less number of these registering devices may be employed if found desirable. I have also shown but three indicating keys in the tens of dollars series, as this, it is believed, will be found sufficient for all ordinary purposes, although more or less may be employed.

The reference numeral 1 designates the casing of the apparatus, see Fig. 6, the front of which is provided with apertures for the passage of the indicating and registering keys, and also with a hinged or pivoted door, provided with a suitable locking device. By opening this door the registering mechanism may be inspected and adjusted.

The numeral 2 denotes the frame, which supports the indicating and registering mechanisms, and consists of side uprights connected together at the front by transverse rods 4 and at the rear by a bar 5, see Figs. 2, 4, 6 and 7.

The numeral 6 designates the sliding till cover, having a hand bar 7 at the front end, and at its rear end at each side and at the center is provided with sockets 8, in which is journaled a transverse shaft 9, to the ends of which are secured arms 10. Pivoted to one end of each of these arms is a weighted arm 12, see Figs. 1 and 7, the upper ends of which are secured to a rock shaft 12ª journaled in the frame 2. To the other ends of said arms 10 are pivoted bars 13, pivoted to the front upper end of said frame. These arms, bars and shaft support the rear end of the till cover, the front end of which slides on the sides 14, of the till or cash receptacle. To the rear of said cover at one side, see Fig. 4, are two catches 15 and 16, which serve to lock the same when opened and closed, as will be hereinafter described. At the other side the cover is provided with a lug 17, see Figs. 1 and 6, adapted to engage with a dog 18, pivoted to a lug 19, on the lower end of an arm 20 pivoted to the inner side of one of the side uprights of the frame. A similar arm is pivoted to the opposite uprights and they are connected together at their lower ends by a transverse rod 23, provided with a spring 24, connected with the bar 5, secured to the rear of the frame. The dog 18 is formed with shoulder 26, so constructed that when the cover is opened the dog will give when struck by the lug 17, so that the latter will pass by without actuating said arm, but when the cover is being closed the lug will strike the dog and the said shoulder engaging with the lug will cause the said arms 20 and rod 23 to be actuated. The object of this arrangement is that when one of the indicating keys is depressed all the other keys are locked and so held until the cover has been opened and closed. For this purpose, the said arms 20 intermediate their ends are formed with shoulders 27, see Figs. 4 and 6, with which are adapted to engage studs 28, on the rearwardly extending arms 29, journaled on the transverse rod 30, which carries the indicating keys 31. This rod 30 is secured to the uprights of the frame. The rear ends of arms 29 are formed with slots 32, in which play studs 34, on the ends of a transverse plate 35, secured to a bar 36. The said bar and plate are supported by arms 37, pivoted to the side uprights and at their upper ends are provided with apertures through which the studs 34, pass. Secured to said arms 29 in front of plate 35 is a transverse rod 29ª, Figs. 3 and 4. When an indicating key is depressed its rear end will strike the rod 29ª, raising the same, through the medium of plate 29 which in turn will throw plate 35 forward when its lower edge will rest upon all the keys not depressed, thus preventing movement thereof. At the same time the upper edge of the plate will engage under the rear end of the key just depressed and hold it in such position until the till cover has been opened and closed.

The indicating keys are each composed of two pieces of metal, and each piece being an exact duplicate of the other. As seen in Figs. 20 and 21, these pieces comprise a front portion, having a bend near the center, a semicircular head 39, at the front end and upwardly extending and outwardly bent lug 40, hole or aperture 41 at or near the center, the rear portions 42, having extension 43, which engage with said rod 29ª when the key is depressed. The two parts are joined together at front and rear by rivets 44 and 45, the rear portions being separated from each other, while the front portions are close together. The lugs 40 form finger rests for the fingers when depressing the key, while the heads 39, form a button to receive a designating character. These indicating keys are pivoted to shaft or rod 30, see Figs. 1, 3, 6 and 8, and are alternately arranged in two rows or banks, one above the other, and having their front ends provided with cash indicating characters or numerals. These characters, beginning at one side of the machine, are arranged in series of nines, as above set forth, and each series corresponds with a registering device hereinafter described. These keys are preferably arranged with the keys indicating cents sales on the right of the machine, while the dollar keys are on the left, and the keys indicating decimals of a dollar, intermediate thereof, although it is obvious that the order of arrangement may be reversed if desired or found convenient. As shown in the present instance, the first nine keys, which indicate the units, are arranged in regular numerical order from "1" to "9" with the odd numbers in the lower row or bank and the even numbers above. The next series of keys, representing the decimals, follow in similar order from "10" to "90," while the next series, representing the dollars, are similarly arranged and marked from "$1" to "$9." and so on.

Journaled on a transverse bar 46, secured to the side uprights of frame 2, are a number of dogs 47, one for each of said keys. See Figs. 3, 4, 6, 8 and 10. These dogs are of peculiar shape, comprising a hub 49, bent upwardly extending arm 50, forwardly extending weighted body 51, and a projection 52. The arms 50 vary in height, in regular order, forming as it were, a series of steps, so that for each series of nine keys, the said arms will gradually vary in height, as seen in Figs. 2 and 8. These arms pass up between the rear portions of the keys, with the rivets 45 of said keys engaging with said projections 52, see Figs. 3 and 10, so that as a key is depressed the arm passing therethrough will be thrown rearwardly in the path of a bail hereinafter described and form a stop therefor. Directly in rear of each series of said keys is a transverse rod 53, Figs. 3, 6, 8 and 10, secured near each end to two vertical arms 54, journaled on the bar 46. Each of these rods is made to bear against all of the keys of the series to which it belongs, by means of coiled springs 55, secured thereto and to the transverse rod 4, secured to the uprights of the frame. One of the arms 54, of each rod is extended upwardly and is formed with a notch or recess 57, with which engage bails 58, one for each series of keys. Each of these bails consists of a transverse rod secured to arms 59, which are journaled on a transverse rod 60, and also secured to levers hereinafter described; and with each of said rods is connected a coiled spring 61, also connected with the transverse bar 5. The tendency of the springs is to pull the bails down, when a key is being depressed, their movement being limited by the arms of the dog 47, connected with the key depressed, and as said arms vary in height, the movement of said bail will vary according to the key depressed, whereby the throw or stroke of the registering levers and pitmen which actuate the registering mechanism is correspondingly varied, as will be hereinafter explained.

The numerals 62, 62$^a$, 62$^b$ and 62$^c$ designate registering levers, journaled on the rod 60, and arranged in sets or groups of four each, there being one set for each registering mechanism, and as there are four such registering mechanisms illustrated in the present case, there are consequently four sets of such levers. Each of these levers, see Figs. 3, 8 and 9, consists of two plates comprising a hub 63, a short upwardly extending arm 64, and a long forwardly extending curved arm 65. These plates are connected together by rivets 67. Each lever of one set is connected with the corresponding levers of all the other sets or groups by means of arms 68 and bar 69. That is to say, all of the levers 62, are connected together; all of 62$^a$; all of 62$^b$ and all of 62$^c$, so that when one of said levers is actuated all of the levers connected therewith are moved or actuated. The bail 58 on the right of the apparatus is connected with levers 62 of the set or group immediately in the rear thereof, the next bail with lever 62$^a$ of the next group and so on. In front of the short arms of said levers is a transverse rod 70, the ends of which are connected with the upper ends of levers 71, pivoted to the rod 60, see Figs. 2, 3, 4, 6 and 7. The lower ends or arms of these levers are curved extending downwardly and inwardly, and have their ends bent forming curved feet 72, which engage with slots or openings near the rear end of the sliding till cover, whereby said levers and rod are actuated by the movement of said cover.

Pivoted to the front ends of the registering levers are blocks 73, provided with upwardly extending pitmen 74, having rack teeth 75, and also provided with upwardly extending rods 76, which serve as guides for the pitmen. These pitmen are vertically movable in slots in said blocks so that their height may be regulated and are held in their adjusted positions by set screws 77, see Fig. 23. The teeth 75, of said pitmen are adapted to engage with the teeth or cogs of registering wheels hereinafter described for registering the amount of sales made or other amounts according to which registering mechanism is operated. Each of these pitmen and its corresponding registering lever are thrown into operative position, respectively, by the different series of indicating keys,—that is to say the lever and its pitman on the right of each registering mechanism are adapted to be thrown into engagement with the registering wheels by the depression of either of the units-keys numbered from "1" to "9," while the next lever and pitman will be operated to register the decimals by the depression of the corresponding keys, numbered, respectively, from "10" to "90," and so on.

Referring to Figs. 3, 6, 8, 11, 12 and 15, the numeral 78, designates the frames of the registering mechanisms, consisting of upright walls suitably secured together, and having apertures at the top and bottom through which pass the rods 4, by which they are supported. In the upper part of these casings, is secured a transverse shaft 79, on which is journaled a series of registering wheels 80, having teeth or cogs 81, on their peripheries with which the teeth of the pitmen engage. These wheels are entirely distinct from each other and are separated by means of hubs 82. Located above said shaft is a rod or bar 83, on which is journaled a series of spring actuated dogs or pawls 84, which engage with the cogs of the registering wheels and prevent backward movement thereof. These wheels 80 in the present instance are provided with thirty teeth each and at intervals of every ten teeth are provided with lateral fingers or pointers 85. Adjacent to each of the wheels is a curved indicating plate 86, having numerals thereon running in regular order from "0" to "9," the fingers or pointers projecting over the plates as seen in Fig. 11. The wheels and pitmen are actuated by the pitmen before set forth by depressing the indicating and registering keys, and after each finger has traversed the curved plates, or been moved nine points, the finger on the next wheel to the left will be moved one point thus indicating that the first finger has traveled nine points, and a new or succeeding finger or pointer will appear at zero on the first named plate. Secured to a shaft journaled in the sides of each of the said casings is a registering key 87, having its front end extending through an aperture in the front of the casing of the apparatus, and near its fulcrum or pivot is provided with an upwardly extending pivoted link 89, the upper end of which is pivoted to a rearwardly extending hooked lever 90, fulcrumed on a stud 91 on the registering casing. The hooked end of this lever engages with a bail 92, pivoted to the side uprights of the frame 2, and carrying a depending arm 93, having a slot 94 at its upper end with which engages a pin 95, on said bail, see Figs. 2 and 4. This bail is also provided with a coiled spring 96, and its purpose is to lock and unlock the till cover as will be hereinafter described. Also pivoted to stud 91 are arms 91$^a$ which rest on said bail which bail in its upward movement raises said arms so that they will strike laterally projecting pins 97, on cranks 98, secured to one of the eccentric shafts 100, having a series of peripheral grooves 101, with which the registering pitmen engage. The object of these eccentric shafts is to throw the pitmen out of engagement with the registering wheels when a registering key is depressed and to throw them into engagement therewith when said key is released. Each crank 98 is provided with a spring 102, Figs. 6, 8, 11 and 15, for holding the eccentric shaft in position when thrown backward or actuated as before set forth, and pivoted to the registering key is a spring actuated lever 103 having a hooked end which is adapted to engage with said pin 97, when the key is returned to normal after being depressed so as to throw the pitmen into engagement with the registering wheels. This arrangement is employed when a number of registering mechanisms are employed—as for instance, when one registering mechanism is employed for registering cash sales, another for registering credit sales, another for registering amounts taken from the drawer,&c.,—the object being to allow only the mechanism whose key has been depressed to register, as will be more fully hereinafter explained.

For the purpose of moving one of the fingers of the registering wheels one point by means of the registering key when an adjoining wheel registering less values has made ten movements or points, I provide the following means, see Figs. 3, 11, 12, 15, 17 and 18. Journaled on a shaft 104, in the front of each registering casing, are a number of rearwardly extending curved arms 105, provided with springs 106, the tendency of which is to force said arms downwardly. Pivoted to one end of each of said arms is a pivoted spring actuated dog or pawl 107, having a pin or stud 108, which engages with a slot 109 in the rear end of a two-armed trip lever 110, vertical arm 112 of which is beveled and hooked and lies in the path of the fingers or pointers of the registering wheels. Secured to the shaft 113, to which the registering key is attached is a step cam block 114, similar to that shown in my patent before alluded to, which when said key is depressed is elevated, striking the ends of arms 105 and elevating them and their dogs. As long as the levers 110 are not tripped, the dogs or pawls will be thrown away from the registering wheels so that when elevated by the cam block they will not engage with the teeth thereof. When, however, one of the pointers or fingers strikes the beveled end of the vertical arm of one of said levers, it will trip the same elevating the rear arm of the lever and throwing the dog or pawl forward so that when elevated by said block it will engage with the registering wheel and move it one point.

For the purpose of displaying the amount of a sale, or other transaction, as it is registered, I provide the following arrangement, see Figs. 3, 6, 7 and 13. Secured to the upper ends of the uprights of frame 2, are two transverse plates $106^a$, provided with a number of rods $107^a$, Figs. 6, 7 and 13 one for each registering mechanism. These rods are located a short distance above and in rear of the registering mechanisms, and on each is pivoted a series of display plates, ten in number, bearing characters, running in regular numerical order from "0" to "9," the highest number "9" being at the rear and "0" in front. Each of these plates consists of the upper portion $108^a$, bearing the designating character, connected with an arm $109^a$, which is journaled in one of said rods, and a curved arm $110^a$, the end of which when in normal position rests upon a sliding rod $112^a$, provided on its under side with a series of teeth $113^a$. These rods are each provided with a rib $114^a$, which serves as a stop to limit their forward movement, and with a coiled spring 115. Engaging with the teeth $113^a$ of each sliding rod, is a cogged segment 116, journaled on a stud 117, of a bar 118, secured to said plates $106^a$. This segment is provided with a stud 119, adapted to be engaged by a projection 120, on a cogged segment 121, also journaled on said stud 117. The segment 120 engages with a curved rack bar 123, secured to the registering levers. The rack bar 123 on the right of the apparatus is for operating the display plates for the first or corresponding registering mechanism, and is connected with lever 62, of the first set or group of said levers. The next rack bar is for the next registering mechanism and is connected with lever $62^a$ of the next set or group, the next rack bar is for the next registering mechanism and is connected with lever $62^b$ of the next set or group, while the next rack bar is connected with lever $62^c$ of the set or group at the left of the machine. Secured to the bail 92, is a series of vertical arms 124, Figs. 3, 6 and 13, one for each series of display plates to which are secured yokes 125, pivoted on the rods $107^a$.

The construction and arrangement of the above devices is such that when an indicating and a registering key is depressed as hereinafter explained, the sliding rods $112^a$ will be actuated or moved rearwardly a distance corresponding with the indicating key depressed so as to allow the display plates to fall and show or display a number corresponding to the key depressed.

Secured to the rear plate $106^a$, is a plate 126, to which is pivoted on each side a spring actuated dog 127, each of which is connected with shaft $12^a$ by means of a sliding headed rod 128, passing through lugs $128^a$ on shaft $12^a$. These dogs are adapted to engage with studs 129 on the bail 92, one of said dogs holding the bail in place when depressed and the other holding it in place when elevated. By this construction, when the registering key is depressed and said bail elevated, the latter cannot be depressed until the till cover is opened, when said cover by means of the connections will turn shaft and release the bail, at which time the other dog will engage with the other stud 129 and prevent said key from being again depressed until the till cover is closed. The depending arm 93, connected with bail 92, at its lower end is connected with a lever 129$^a$, fulcrumed to one of the side uprights of frame 2, the front end of which is adapted to engage with the catch 15 of the sliding till cover, to hold or lock the same when closed. Said lever 129$^a$ is pivoted to a stud 130 on one of the side uprights to which is also pivoted a rearwardly extending lever 131, provided with a stud 131$^a$, which lever engages with catch 16, when the till cover is opened and holds it in such position until the registering key has been fully depressed. Also pivoted on said stud is a forwardly extending spring actuated lever 132, having a notch 134 on its lower edge with which engages a stud 134$^a$ on the lever 129$^a$, and having a shoulder at its rear which engages with stud 131$^a$. The object of this lever 132 is to lock the till cover before it is closed so as to prevent opening of the same until it is completely closed. This lever engages with catch 15, as the till cover is being closed, and is disengaged by the movement of the lever 129$^a$, through the medium of bail 92, and as said bail cannot be operated until the till cover is completely closed it is obvious that after catch 15 engages with lever 132, said cover cannot be opened until the lever 129$^a$ engages with catch 15, and a registering key is depressed.

The bell mechanism for sounding an alarm when the till cover is opened, is as follows, see Figs. 2 and 4. Secured to the base of the apparatus is a metal plate 135, having a standard 136 carrying a gong 137. In rear of this gong and pivoted to a stud 138, is a lever 139, provided with a rod 140, having a hammer 141 at its upper end. At its upper end the lever 139 is formed with a beveled flange 142, with which is adapted to engage a horizontal rod 143. The opposite end of this rod is loosely journaled in an upright 145, so as to have a kind of universal movement. This rod is connected with bail 92 by means of a rod 146. A rod 148, limits the forward movement of rod 143. By this construction when the bail 92 is operated the rod 148, rises, which in turn elevates rod 143, which engaging with the under side of flange 142, throws lever 139 backward. When the lever reaches the front end of said flange it will become disengaged therefrom and the coiled spring will force the lever and hammer forward and sound an alarm. Secured to bar 25 is a spring plate 149, see Fig. 7, which engages with the rear end of the till cover when the latter is opened, thus holding it down.

As before stated the registering mechanisms are entirely separate and distinct from each other and only one may be employed, if desired.

The operation is as follows: As shown in the drawings, the parts are in normal position, that is to say, the till cover is closed and locked and the indicating and registering keys are elevated. Supposing now that a sale amounting to five cents is made. The proper indicating key is depressed by pressure upon the front end thereof, as usual. This will cause its rear end to be elevated and by means of the rivet 45, thereof engaging with the projection 52, of the dog 47, located between the rear portions of the key, the arm 50 of said dog will be thrown or moved rearwardly. At the same time said arm 50 will strike the rod 53, of the cents series of keys, disengaging its notched arm 54 from the bail 58, so that said bail can be depressed as hereinafter explained. While these movements are taking place, the rear extension of said key engaging with rod 29$^a$ raising the same and the arms 29 and throwing plate 35 forward so that it will rest upon all the keys not depressed and preventing movement of the same. The rod 29$^a$ will also engage under the rear end of the depressed key and hold it in such position. When the arms 29 complete their upward movement their studs 28 will engage with the notches in the arms 20, whereby said arms 29, rod 29$^a$, plate 35, and the keys will remain locked until the cover is opened and closed as hereinafter explained. The registering mechanisms may be arranged in any order desired, but for the purpose of illustration we will assume that the first mechanism on the right of the machine is for registering cash sales, the second for credit sales, the third for amounts taken from the till, and the fourth for any other purpose found convenient. Now supposing the sale just made to have been a cash sale, there the registering key of the first mechanism is depressed, which through the medium of the link 89 and the hooked lever 90, will elevate the bail 92, and its rod 93. The latter in its movement will disengage lever 129$^a$ from catch 15, which lever by means of stud 134$^a$ engaging with notch 134 of lever 132, will raise said lever out of the path of said catch 15, and thus unlock the till cover. While these movements are taking place, the arms 91$^a$ resting on the bail will be elevated, striking the pins 97, of the crank 98 of the eccentric shafts 100, of all the registering mechanisms and throwing all of the pitmen out of engagement with the teeth of the registering wheels. The movement of bail 92 also raises all the arms 124 and their yokes 125, so as to elevate any of the display plates dropped in registering previous amounts. The above movements take place almost simultaneously, the till cover opening as soon as the registering key begins its downward movement, and is pulled backward by coiled springs connected therewith and with the bar 5. As soon as the till cover is fully opened the catch 16 will engage with lever 131 and prevent said cover from being closed until the registering key has completed its movement. The rearward movement of the till cover also oscillates shaft 12ª, causing one of the dogs 127, to engage with one of the studs 129 on bail 92, thus holding said bail in its elevated position and locking the registering key. This key will continue locked until the till cover is closed, when said dog will be thrown out of engagement with the stud, by the movement of the rock shaft, allowing the bail and key to be returned to normal by spring 96. As the till cover moves backward or open the levers 71, engaging with the slots in said cover will be actuated, causing the transverse rod 70, to be moved forwardly and allowing the bail 58, just above the indicating key depressed to drop down until it comes in contact with the dog which has been thrown backward by said key. This bail in its movements causes the lever 62, which is connected with it to be correspondingly depressed, and as each of the levers 62 of all the sets or groups are connected together they will all move in unison. The extent of the movement of these levers determines the movement of the registering wheels. The registering key which has been depressed, in rising, by means of the hooked lever 103, actuates the eccentric shaft 100, connected with the key depressed, so as to allow the pitmen 74, to engage with the registering wheel of the registering mechanism. The pitmen for operating all the other registering mechanisms however, are not actuated so that they are held out of engagement with the registering wheels thereof. Upon the till cover being closed the transverse rod 70 will be forced back by the levers 72, causing the lever 62, which has dropped down as aforesaid to be elevated and the pitman connected therewith to be elevated, and turning the cents registering wheel a distance equal to five points and causing the pointer thereof to move from "0" to "5" thus indicating that a sale amounting to five cents has been made. As the said lever 62 is actuated the rack bar 123 is correspondingly moved, which engages with and operates segment 121. The projection 120 on this segment engaging with stud 119 on segment 116, actuates the latter which in turn moves the sliding rod 112ª, rearwardly, releasing the first five display plates from "0" to "4," inclusive and allowing them to drop down, and the "5" plate to be displayed. As before stated each of the registering mechanisms is separate and independent from the other, and each mechanism is provided with a cents registering wheel, a dime registering wheel, a dollar registering wheel and so on, and the lever 62 and its pitman actuate the cents wheel, 62ª the dime wheel, 62ᵇ, the dollar wheel and 62ᶜ the tens of dollars wheel. In the instance above described a cents sale was made and consequently the corresponding or first wheel on the right of the registering mechanism is actuated. If a dollar sale had been made lever 62ᵇ would drop down and its pitman would actuate the third or dollar wheel of the registering mechanism. In the same manner the lever 62ª will actuate the dime wheel. It will be noted that there are four sets of display plates, the set to the right designating the cents, the next successive set the dimes, the next the dollars and the next the tens of dollars. The cents display plates are operated by the bail 92 in connection with levers 62; the dime plates by said bail and lever 62ª, and so on, and as all the levers of one registering mechanism are connected with the corresponding levers of the other mechanisms, it follows that no matter which registering mechanism is operated, the amount registered thereby will be properly displayed. As before stated one of the dogs 127 engages with the stud on bail 92 to hold it elevated until released by the movement of the till cover when it is opened, thereby preventing another registering key from being depressed until said cover is opened. The other dog 127 will then engage with the stud on the bail holding the latter depressed until the till cover is closed. From this it will be seen that when a registering key is operated, no other key can be operated nor can the same key again be operated until the till cover has been opened and closed. As the till cover opens it will sound an alarm on the gong, and in closing the lug 17, will engage with the dog 18, and actuate the arms 20, releasing them from engagement with the arm 29, allowing the plate 35 and rod 29ª to fall and the indicating keys to be released. The plate 35, is thrown forward to lock said keys by the studs 34, engaging with the slots 32, of arms 29, which latter are actuated by the depression of an indicating key, the rear end of which engages with the rod 29ᵃ secured to said arms.

Having thus described my invention, what I claim is—

1. In a cash register, the combination with the indicating keys having their rear ends separated and connected together by a rivet, of the pivoted dog having a weighted arm and a projection with which said rivet engages; substantially as described.

2. In a cash register, the combination with the frame, a transverse rod secured thereto, the indicating keys pivoted on said rod, the transverse rod located in rear thereof and the dogs pivoted to said last mentioned rod and adapted to be actuated by the movement of said keys, of the rod located above and in rear of said keys, the levers journaled on said rod and provided with pitmen, the bails pivoted on said rod and connected with said levers, and means for actuating said levers by the movement of a sliding till cover.

3. In a cash register, the combination with the frame, a transverse rod secured thereto and the indicating keys pivoted thereon, the dogs and the rod to which they are pivoted, of the rod located above and in rear of said keys, the levers journaled on said rod and provided with pitmen, the bails pivoted on said rod and connected with said levers, the pivoted arms, the transverse rod carried by said arms and adapted to actuate said levers, by the movement of the till cover; substantially as described.

4. In a cash register, the combination of the frame, a transverse rod secured thereto, the indicating keys pivoted on said rod, the transverse rod located in rear of and below said keys, the dogs and notched arms pivoted to said last mentioned rod, the pivoted bails and the levers connected therewith; substantially as described.

5. In a cash register, the combination with the frame, the transverse rod secured thereto, and the indicating keys having rear extensions pivoted thereon, of the slotted side arms pivoted to said frame and having studs intermediate their ends, the arms pivoted to said frame connected with a transverse plate adapted to engage with the extension of said keys, the studs engaging with the slots in the side arms, the depending arms pivoted to the frame having shoulders with which the studs of the side arms are adapted to engage, the sliding till cover and means substantially as described for throwing said studs and shoulders out of engagement by the movement of said cover.

6. In a cash register, the combination with the frame, the transverse rod secured thereto, the indicating keys, having rear extensions, pivoted thereon, of the slotted side arms pivoted to said frame, and having studs intermediate their ends, the arms pivoted to said frame connected with a transverse plate adapted to engage under the rear extension of said keys, the studs engaging with the slots in the side arms, the depending spring actuated arms pivoted to the frame having shoulders with which the studs of the side arms are adapted to engage, the transverse bar connecting said arms, the dog pivoted to one of said arms, the sliding till cover and the lug carried thereby adapted to engage with said dog and trip said arms as said till cover is closed; substantially as described.

7. In a cash register, the combination of the frame, the transverse rod secured thereto, the indicating keys, pivoted to said rod, having separated rear ends joined together by a rivet and formed with rear extensions, the transverse rod located below and in rear of said keys, the dogs and notched arms pivoted on said last mentioned rod, the transverse rod secured to said arms, the slotted side arms pivoted to the sides of the casing, the bar connected with said side arms, the transverse plate having studs working in the slots of said arms and the pivoted arms connected with said plate; substantially as described.

8. In a cash register, the combination with the frame, the transverse rod secured to the rear portion thereof, the two armed levers pivoted thereon provided with registering pitmen and guide rods, and means for actuating said levers and pitmen, of the registering mechanism having registering wheels with which said pitmen and guide rods are adapted to engage, the eccentric shaft having grooves with which said pitmen and guide rods engage, and a crank and a pin, the registering key secured to a shaft journaled in the casing of the registering mechanism the hooked arm pivoted to the casing the bar connecting the same with the registering key, the pivoted bail with which said hooked arm engages, and the arm pivoted to said casing with its free end resting on said bail and adapted to engage with said pin to actuate the eccentric shaft; substantially as described.

9. In a cash register, the combination with the frame, the transverse rod secured to the rear portion thereof, the two armed pivoted levers pivoted thereon, provided with pitmen and guide rods, and means for actuating said levers, of the registering mechanism having registering wheels and pointers, the eccentric shaft provided with a crank and pin, journaled in the casing of the registering mechanism and having grooves with which the said pitmen and guide rods are adapted to engage, the registering key secured to a shaft journaled in said casing, the hooked arm pivoted to the casing and engaging with a pivoted bail, the bar connecting said arm and key, the rearwardly extending arm pivoted to said casing and resting on said bail, and the upwardly extending spring actuated hooked arm pivoted to said key and adapted to engage with the pin on the crank of the eccentric shaft; substantially as described.

10. In a registering mechanism for cash registers, the combination with the casing, the registering wheel having cogs or teeth and pointers, the curved plates located between said wheels having numerals thereon, the transverse shaft, the registering key secured thereto, and the oscillatory cam block, of the spring actuated curved arms journaled on a shaft in the front of the casing, the spring actuated dogs pivoted to the free ends of said arms, provided with studs, the two armed trip levers each having a slot in one arm in which said studs work and the arm hooked and beveled to engage with the pointers on the registering wheels; substantially as described.

11. In a cash register, the combination with the frame, the transverse rod secured to the rear portion thereof, the two armed levers pivoted thereto, the curved rack bars secured thereto, the pivoted cogged segment having a shoulder, the pivoted cogged segment having a stud engaging with said shoulder, the spring actuated rack bar engaging with said last mentioned segment, the pivoted display plates, substantially as described.

12. In a cash register, the combination with the pivoted bail connected with and actuated by a registering key, and provided with studs at or near its center, of the spring actuated dogs with which said studs are adapted to engage, the sliding rods connected with said dogs and with an oscillatory shaft at the rear of the apparatus, and means substantially as described for oscillating said shaft by the movement of the till cover.

13. In a cash register, the combination with the bail connected with and adapted to be operated by a registering key and provided with studs, at or near its center, of the spring actuated dogs with which said studs are adapted to engage, the headed sliding rods connected with said dogs, the oscillatory shaft, having studs having apertures through which said rods pass, the weighted arms secured to said shaft, the bars pivoted to the casing of the apparatus, the sliding till cover and the arms pivoted thereto and to said bars and arms; substantially as described.

14. In a cash register, the combination with the sliding till cover, the shaft at the rear end thereof, the arms secured to said shaft, the bars pivoted to said arms and to the casing of the apparatus and the weighted arms pivoted to said arms and to an oscillatory shaft, substantially as described.

15. In a cash register, the combination with the pivoted bail connected with and adapted to be operated by a registering key, of the spring actuated depending rod connected therewith, the lever 129$^a$ connected with said rod, the rearwardly extending lever 131, adapted to be actuated by lever 129$^a$, the sliding till cover catch 15, with which said levers are adapted to engage; substantially as described.

16. In a cash register, the combination with the pivoted bail connected with and adapted to be actuated by a registering key, of the spring actuated depending rod connected therewith, the lever 129$^a$ connected with said rod having a stud 134$^a$, the lever 132 having a notch 134, with which said stud engages, the lever 131 adapted to be actuated by lever 129$^a$, and the sliding till cover having catches 15 and 16, with which said levers are adapted to engage; substantially as described.

17. In a cash register, the combination with the pivoted bail connected with and adapted to be operated by a registering key, and provided with studs, the spring actuated dogs adapted to engage with said studs, the headed sliding rods, connected with said dogs the oscillatory shaft with which said rods are connected, and the sliding till cover provided with catches and means substantially as described for actuating said shaft by the movement of the till cover, of the depending rod connected with said bail, the lever 129$^a$, connected with said rod, having a stud 134$^a$, the lever 132, having a notch 134, with which said stud engages, and the lever 131, adapted to be actuated by lever 129$^a$; as and for the purpose specified.

18. In a cash register, the combination with the pivoted bail connected with and adapted to be actuated by a registering key, of the plate secured to the base of the apparatus having a standard carrying a gong, the pivoted spring actuated arm carrying a hammer or striker, and having a beveled or curved head, the rod loosely pivoted in a standard of said plate, the rod connecting said rod and bail and the vertical guide rod for limiting or guiding the movement of said pivoted rod; substantially as described.

19. In a cash register, the combination with the two armed registering levers and means for operating the same, of the slotted block pivoted to the long arms of said levers, the guide rods secured to said block, and the vertically adjustable pitman seated in the slot in said block and the set screws for holding said pitman in place; substantially as described.

In testimony that I claim the foregoing as my own I have hereunto affixed my signature in presence of two witnesses.

OLE TVERDAL.

Witnesses:
L. K. LUSE,
BEN. E. WAIT.